United States Patent [19]

Hsiang

[11] Patent Number: 4,530,135
[45] Date of Patent: Jul. 23, 1985

[54] ROLLER WHEEL BALER

[76] Inventor: Kuo M. Hsiang, No. 9, Alley 22, Lane 22, Sheh Tzu St., Szu Lin Area, Taipei, Taiwan

[21] Appl. No.: 520,005

[22] Filed: Aug. 2, 1983

[51] Int. Cl.³ .................. A44B 21/00; B25B 25/00
[52] U.S. Cl. .................. 24/68 CD; 24/68 R; 294/74
[58] Field of Search ........... 24/68 CD, 68 R, 69 CT, 24/70 CT, 70 ST, 71 T, 71 CT, 71.1, 20 TT, 115 L, 115 N, 129 A, 483, 484; 294/74, 75

[56] References Cited

U.S. PATENT DOCUMENTS

| 3,175,806 | 3/1965 | Prete, Jr. | 24/68 CD |
|---|---|---|---|
| 3,686,715 | 8/1972 | Brodnicki | 24/68 CD |
| 3,887,966 | 6/1975 | Gley | 24/71.1 |
| 4,185,360 | 1/1980 | Prete, Jr. et al. | 24/68 CD |
| 4,199,182 | 4/1980 | Sunesson | 24/68 CD |
| 4,324,022 | 4/1982 | Prete, Jr. | 24/68 CD |
| 4,324,023 | 4/1982 | Prete, Jr. | 24/68 R |

FOREIGN PATENT DOCUMENTS 148476 5/1981 Fed. Rep. of Germany .... 24/115 L

Primary Examiner—Victor N. Sakran

[57] ABSTRACT

A roller wheel baler comprising a roller wheel and a braking mechanism, characterized by a touch-and-go transmission across a transverse slotway on the outer rims of a free roller wheel provided in a bevelled groove and a transmission roller wheel provided with oneway ratchet wheel on the pivotal grooves on both terminals thereof and the patterned indentation together with transmission of the handle drive board to roll past a baling rope in-between so that the rope may be pulled to exert binding or tying or baling or tightening stresses, which, together with the arrangement to have an inverted tooth member that is the front tip of the braking board for the braking mechanism thrusted against the topmost rim of the center of the fix support, will cause the active rope to move ahead in just one direction, which, in conjunction with the tightening action rendered by the compressor unit, will secure a reliable baling, packing, tightening, binding, tying operation of the article being treated as such therewith.

5 Claims, 4 Drawing Figures

ROLLER WHEEL BALER

An improvement of U.S. Pat. No. 4,185,360, characterized by the achievement in convenience in operation in spite of limitations due to structural space.

A Roller Wheel Baler, comprising one set of wheel compressors and a braking device. The roller wheel compressor serves to transmit a transmission roller wheel that is provided with oneway ratchet for rotation by means of a drive board that is provided on a handle. An active roller wheel is also provided and is disposed in a bevelled slot. The roller wheels provide a complementary rolling function to fasten the tape used to pack merchandise on a truck, for example. Convenient and effective baling of the merchandise is achieved without rolling up or backrolling the fastened tapes. A braking board is provided for the braking device which serves to tighten up the ropes or tapes in conjunction with the roller wheel compressor so that the tapes can take the stress of the merchandise without letting loose. When it is desired to loosen the straps, tapes or ropes, it is easily done by setting the drive board on the handle apart from the oneway ratchet concurrent with a manual activation of the braking board to relieve the braking action, and the baling tape or rope will be released accordingly.

THE DRAWINGS

The present invention provides for a roller wheel baling machine, more particularly a baler that consists of a roller wheel compressor and a braking mechanism. The compressor provides interleaved rolling action between a transmission roller wheel having a oneway ratchet and a free roller wheel to tighten up the tapes or ropes, which need not be rolled upon a roller as done in the prior art. This saves physical space. The tapes or ropes are restrained from being loosened whilst they are being tightened thanks to a coactive braking board which engages the tape or rope and constitutes the braking mechanism.

Figure 1:
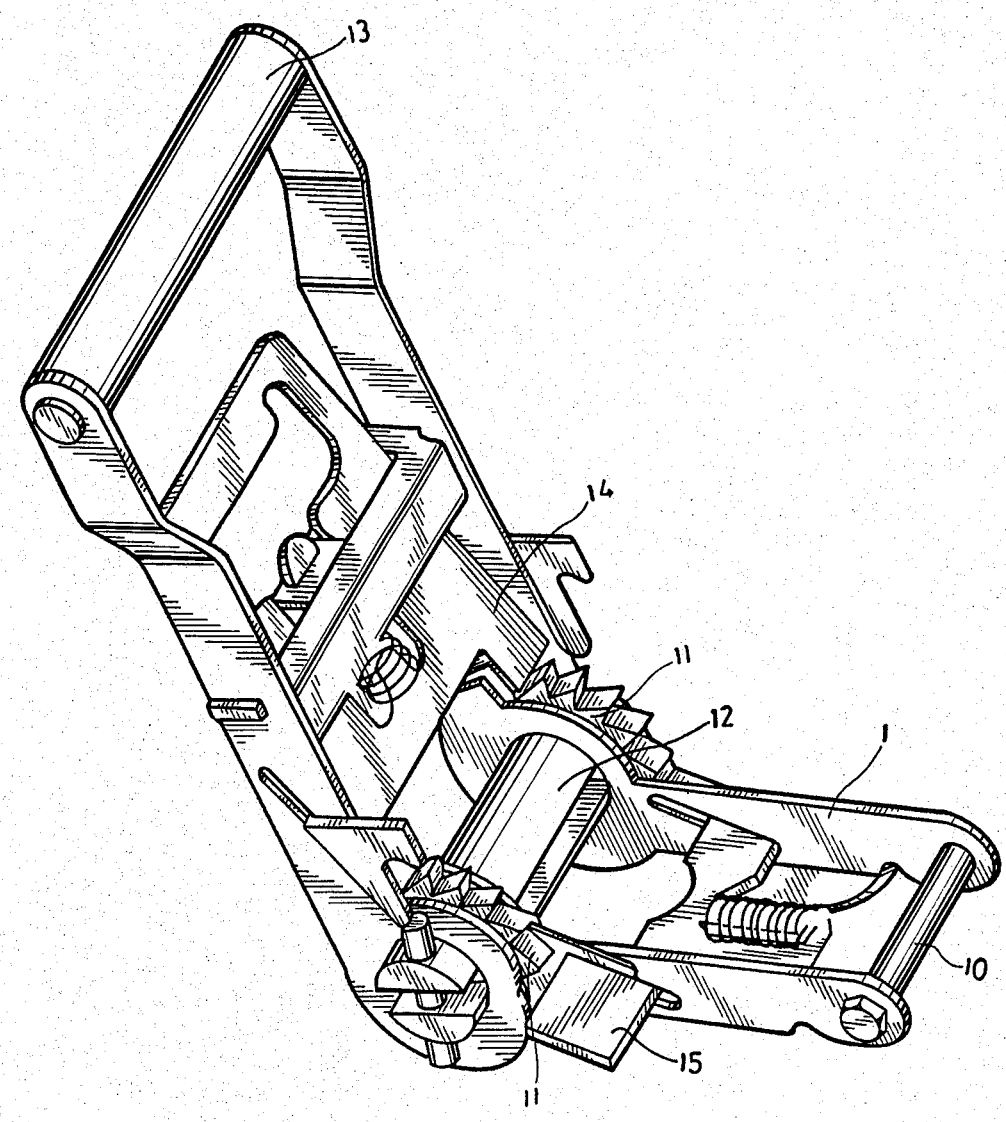
FIG. 1 is a three-dimensional perspective of a conventional baler.

Baling operations for merchandise carried by trucks are necessary to avoid dropping the merchandise en route due to shocks received by the truck in travel. A review of baling operations gives the understanding that such operations are both and that human and time consuming, labour strength is much too limited to achieve in a secured baling without the aid of baling devices. Since the safety of the merchandise was at risk, baling machines were invented, such as the baler illustrated in FIG. 1, (which is similar to the disclosure of U.S. Pat. No. 4,185,360). One end of the strap, tape or rope is fitted to the fixed bobbin 10 on the strap, tape or support 1, the rope circling around the merchandise loaded on the truck and penetrating drum 12 of the oneway ratchet 11. Drum 12 is rotated by the action of the drive board 14 of the handle 13 and, a braking board 15 is provided on the support 1 such that the up-and-down transmissions by handle 13 cause the oneway ratchet 11 to unilaterally tighten the strap, tape or rope which will be wound around drum 12 to secure a tightening of the merchandise bit by bit. From the Figure it is apparent that the location of the drum shaft 12 is surrounded by components including handle 13, drive board 14 and support 1 thereby restricting the length of strap, tape or rope which the shaft 12 can pick up. In cases of the baling or tightening supple or elastic substances such as cotton, cloth, texture, and the like, it is very likely that shaft 12 is filled and thereby becomes blocked and impeded from further rotation due to the large volume of the strap, tape or rope used therefor. Thus such devices would fail to achieve a secured tightening of such merchandise.

In view of the foregoing, the inventor began to engage himself time and again in working out a perfect solution to the shortcomings found with the use of conventional baling machines. The roller Wheel Baler as described and claimed herein will secure even soft and pliable merchandise in a safe and reliable manner.

The primary object for the invention it is to provide such a Roller Wheel Baler having transversely disposed grooves to accommodate an indentation rolling transmission on the outer rims of the roller wheel, which, together with transmission roller wheels having oneway ratchet provided for the roller wheel compressor and free roller wheels as provided in the bevelled slots, and the pull exerted to the free roller wheels by the bevelled slots and the baling ropes, will carry the baling ropes to move ahead to discharge the baling or tightening operation. The tightened rope or tape may be extended as it would without restriction whatever so as to attain a fully tight-bound and safe, excellent baling, binding, tightening operation of the merchandise to be treated therewith.

A further object of the invention it is to lift up the braking board by the activation of a helical spring against the upper rim of the centre of a fixed support of which the front tip takes the shape of an inverted tooth or teeth such that the binding or baling strap, tape or rope can only move in unilaterally to secure binding or baling operations. This achieves an optimum rope fastening operation in conjunction with the roller wheel compressor unit.

DETAILED DESCRIPTION

Figure 2:
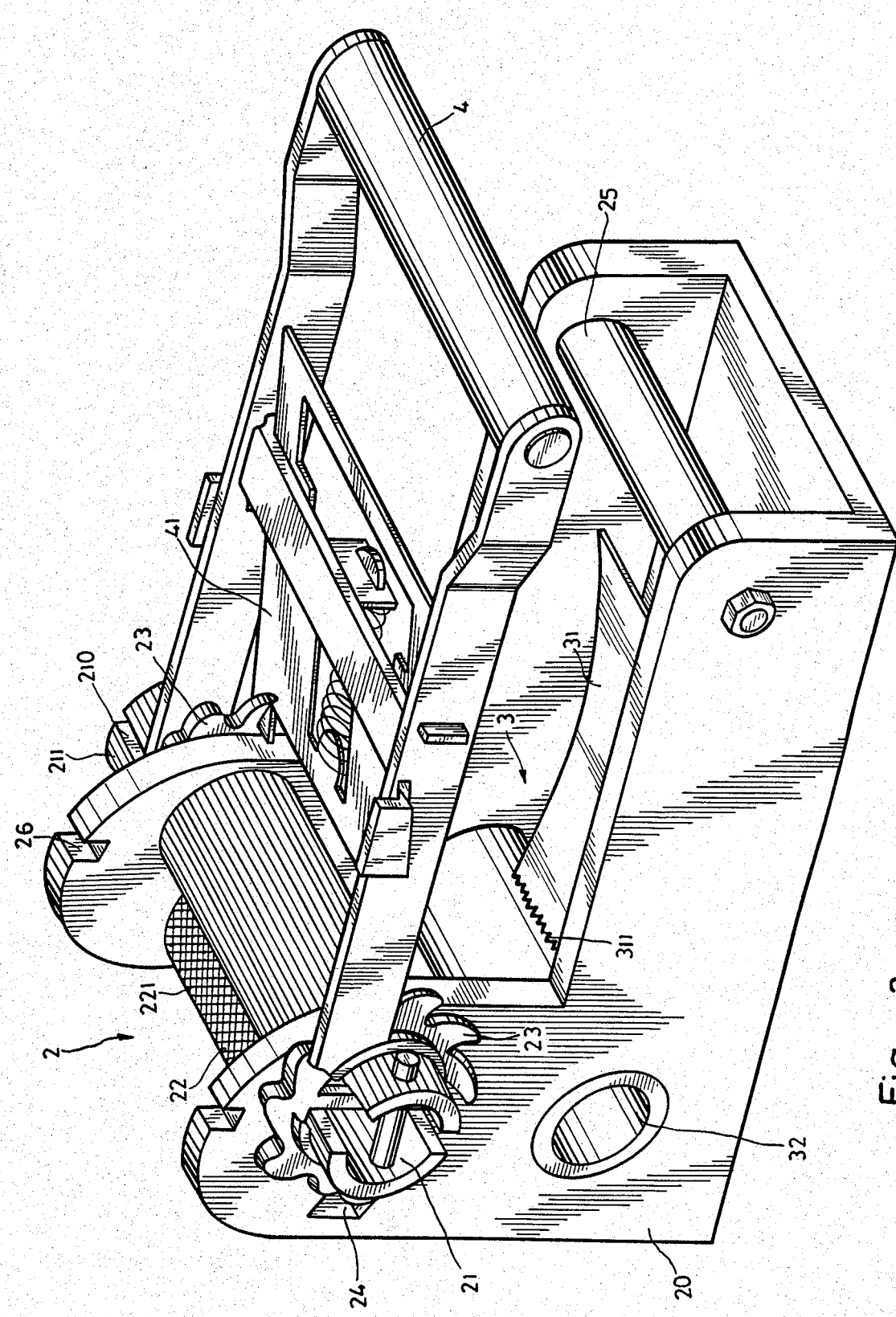
FIG. 2 is a three-dimensional perspective of the invention.
Figure 3:
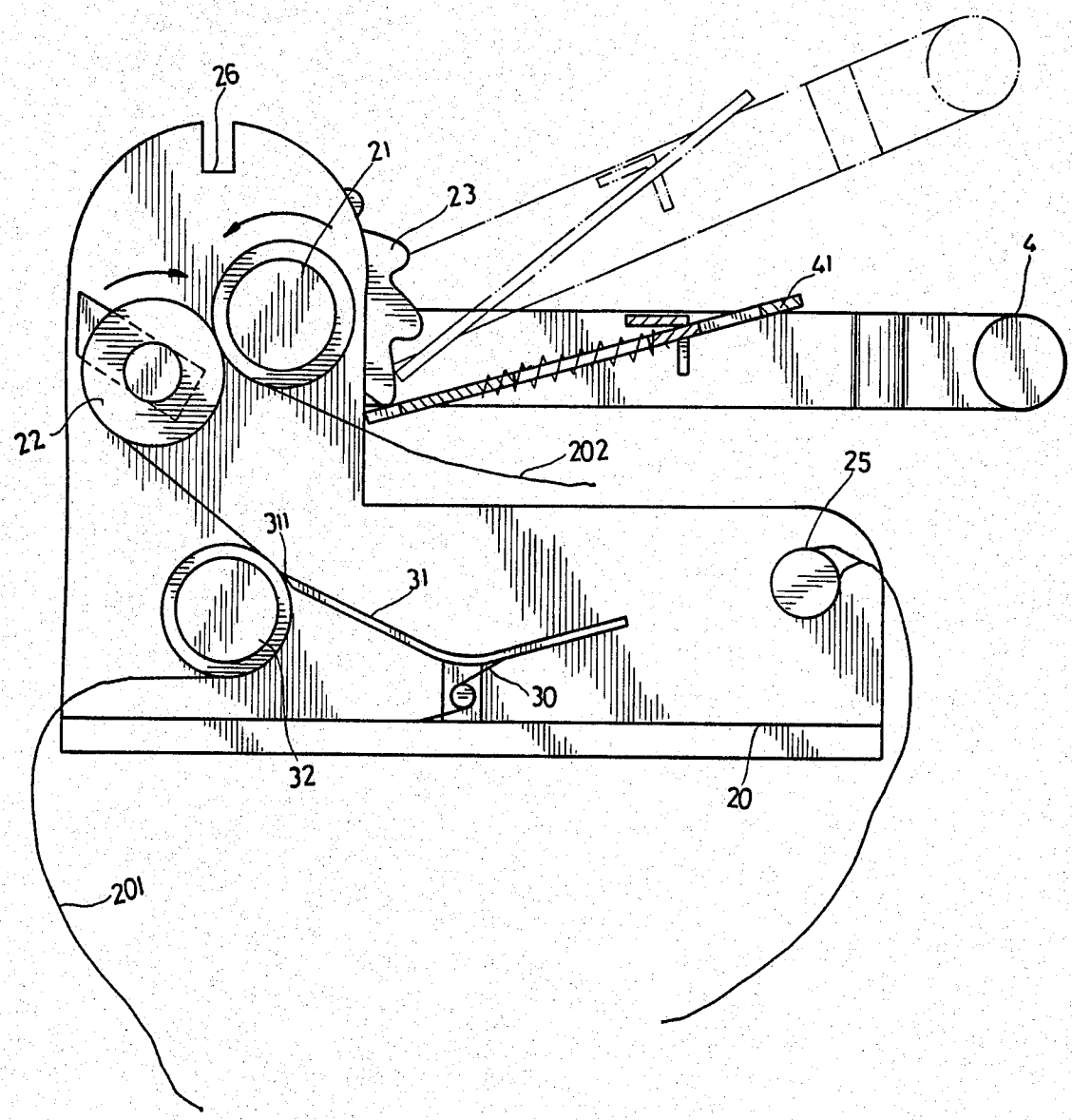
FIG. 3 is an illustration of the baling operations according to the invention.
Figure 4:
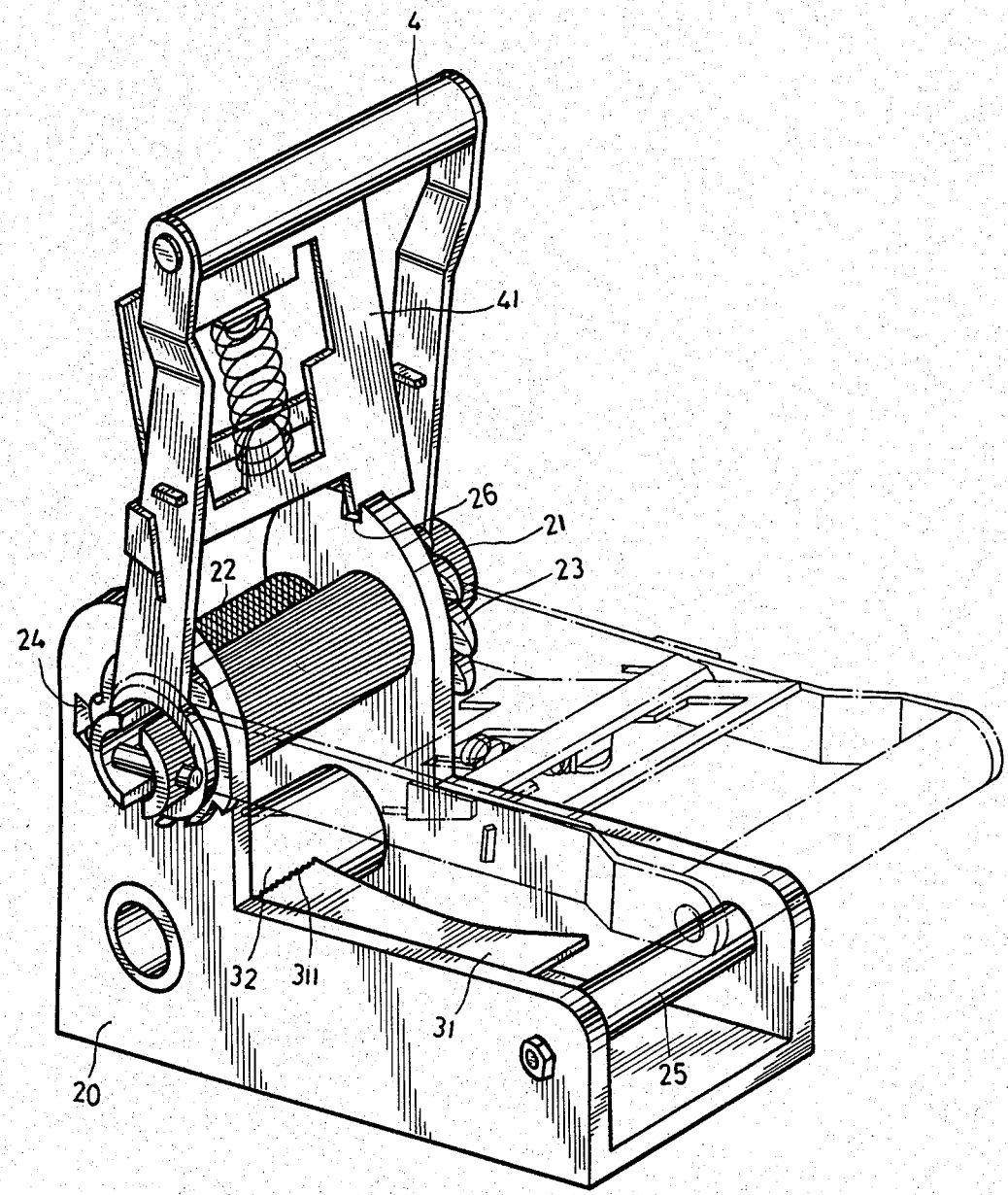
FIG. 4 is an illustration of the unbaling operations according to the invention.

Other objects and advantages will be apparent from the description of the illustrated embodiment of the invention; referring to FIG. 2, a three-dimensional perspective of the invention, it is seen that the roller wheel compressor unit 2 is installed is the top of one side of the body 20, whereas braking mechanism 3 is provided within the body 20. The roller wheel compressor unit 2 consists of a transmission roller wheel 21 and a free roller wheel 22, the transmission roller wheel 21 being engaged with a oneway ratchet wheel 23 by the pivotal slots 210 provided on either terminal thereof. Reciprocating up-and-down movement of the drive board 41 on handle 4 will serve to drive the oneway ratchet wheel 23 and the transmission roller wheel 21 in a oneway rotation. The free roller wheel 22 is provided in a downward bevelled slot 24 on the rear side of the transmission roller wheel 21 such that by virtue of its own weight, the slant of the bevelled slot 24, and the indentation pattern 221 and grooves 211 on the surfaces thereof, a touch and go transmission is provided. Pattern 221 and grooves 211 provide means for gripping strap 201. One end of the strap, tape or rope 201 is fitted unto the fixed bobbin 25 of the body 20. The merchandise cargo is loaded on a truck and as is illustrated in FIG. 3, the free end is thence introduced through one end of the body 20 to travel across that portion between the braking board 31 of the braking mechanism 3 and the fixed support 32, pivoted about free roller wheel 22 and passed across the touch and go aperture between the free roller wheel 22 and the transmission roller wheel 21. Strap 201 is thereupon subjected to pulling stress by the baler. In the meantime, the direction in which strap 201 is being pulled will serve to tighten up the contact pressure between the free roller wheel 22 and the transmission roller wheel 21, thereby reinforcing the rolling pull and thus achieving the function of compressing the strap in discharging the tying, baling, or binding operations. The braking board 31 for the braking mechanism 3 will thrust the inverted teeth 311 provided in front thereof against the upper rim of the centre of the fixed support 32 by means of a helical spring 30 provided in-between the shaft underneath, such that rope 201 will be forced to effect a forward binding in the direction in which the roller wheel compressor unit 2 is pulled unilaterally, rather than sliding to slacken off in the reverse direction by the action of the tension exerted by the merchandise. The invention makes possible a binding and tying of the merchandise by a continuous tightening of strap 201 in conjunction with the compressor unit 2, the strap 202 being subjected to binding or tying tensions may therefore extend as it would without interferring with the operation of the baler at all. When it is desired to loosen the strap 201, handle 4 may be pulled up and drive board 41 set into notches 26 provided straight above the body 20, as shown in FIG. 4. Thus drive board 41 will part from the oneway ratchet wheel 23, and this being done, the tail end of the braking board 31, may be depressed to separate the teeth 311 from the fixed support 32, and the previously tight-bound strap 201 will be loosened accordingly.

The disclosure going thus far for the invention should appear justified to be a safe, reliable Baler that will find satisfactory and effective applications in the baling, packing, tying, binding, and tightening operations of merchandises prepared for truck transportations.

What is claimed is:
1. A baler for use in tightening and tensioning a strap, said baler comprising:
   (a) a body;
   (b) a roller wheel compressor unit including a transmission roller wheel and a free roller wheel, said wheels each including means for gripping the strap, the ends of said free roller being disposed in a slot in said body to permit relative movement of said free roller wheel toward and away from said transmission roller, the strap, in use, being passed between said roller wheels; and
   (c) a braking unit including a braking board, a fixed support member and spring means, the fixed support member being attached to said body, said braking board having a toothed end confronting said fixed support, the strap, in use, being passed between said toothed end and said fixed support, said toothed end being urged by said spring means toward said fixed support member and into engagement with said strap when passed therebetween.

2. The baler of claim 1, wherein said transmission roller wheel is rotatably mounted in said body and said slot is arranged in said body to cause said free roller wheel to move toward said transmission roller wheel by means of its own weight.

3. The baler of claim 1 further including a ratchet wheel coupled to said transmission roller wheel and a drive board for driving said ratchet wheel and transmission roller wheel in one direction only, and said body including means for disengaging said drive board from said ratchet wheel to thereby permit said transmission roller wheel to rotate opposite to said one direction.

4. The baler of claim 3, wherein said body includes notches for temporarily receiving a portion of said drive board when said drive board is disengaged from said ratchet.

5. The baler of claim 4, wherein said braking board has another end remote from said toothed end, said another end being arranged for manual depression to move the toothed end away from said fixed support member.

* * * * *